US012567775B2

(12) United States Patent
Islam et al.

(10) Patent No.: US 12,567,775 B2
(45) Date of Patent: Mar. 3, 2026

(54) ELECTROMAGNETIC MOTOR HAVING PERMANENT MAGNET ROTOR AND STATOR AND METHOD FOR DESIGNING THE SAME

(71) Applicant: HL MANDO CORPORATION, Gyeonggi-do (KR)

(72) Inventors: Mohammad Islam, Bay City, MI (US); Md Sariful Islam, Bay City, MI (US); Amina Shrestha, Bay City, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 273 days.

(21) Appl. No.: 18/121,078

(22) Filed: Mar. 14, 2023

(65) Prior Publication Data

US 2024/0313595 A1     Sep. 19, 2024

(51) Int. Cl.
| | |
|---|---|
| *H02K 1/27* | (2022.01) |
| *H02K 1/24* | (2006.01) |
| *H02K 1/276* | (2022.01) |
| *H02K 1/28* | (2006.01) |

(52) U.S. Cl.
CPC ............. *H02K 1/2766* (2013.01); *H02K 1/24* (2013.01); *H02K 1/28* (2013.01)

(58) Field of Classification Search
CPC ........... H02K 1/2766; H02K 1/24; H02K 1/28
See application file for complete search history.

(56) References Cited

U.S. PATENT DOCUMENTS

| | | | | |
|---|---|---|---|---|
| 11,025,113 | B2 | 6/2021 | Dlala | |
| 2006/0043812 | A1* | 3/2006 | Cheong | ................. H02K 15/03 |
| | | | | 310/156.53 |
| 2013/0169098 | A1* | 7/2013 | Chamberlin | ............ H02K 1/02 |
| | | | | 310/156.01 |
| 2013/0320797 | A1* | 12/2013 | Vyas | .................... H02K 1/2766 |
| | | | | 310/156.43 |
| 2017/0063187 | A1* | 3/2017 | Hao | ........................ H02K 21/14 |
| 2017/0144693 | A1* | 5/2017 | Okubo | ................. B62D 5/0466 |
| 2018/0138763 | A1* | 5/2018 | Nakamura | ............... H02K 7/14 |

(Continued)

FOREIGN PATENT DOCUMENTS

| | | | | |
|---|---|---|---|---|
| CN | 106329771 A | * | 1/2017 | ............. H02K 1/276 |
| WO | 2018/210577 | | 11/2018 | |
| WO | 2020/092647 | | 5/2020 | |

*Primary Examiner* — Thomas Truong
(74) *Attorney, Agent, or Firm* — WOMBLE BOND DICKINSON (US) LLP

(57)     ABSTRACT

A vehicle comprises: one or more road wheels configured to cause the vehicle to move; a steering wheel configured to generate an input for controlling the one or more road wheels; a brake assembly configured to operate a vehicle brake associated with the one or more road wheels; and one or more motors operatively connected to one or more of the one or more road wheels, the steering wheel and the brake assembly, at least one of the motors comprising: a stator assembly; and a rotor assembly configured to be rotatable relative to the stator assembly, the rotor assembly having a plurality of poles, wherein each of one or more of the poles of the rotor assembly comprises one or more substantially I-shaped slots and one or more substantially flat-top-U-shaped slots. One or more magnets may be disposed in one or more of the I-shaped slot(s) and the flat-top-U-shaped slot(s).

15 Claims, 7 Drawing Sheets

(56)                         References Cited

U.S. PATENT DOCUMENTS

| | | |
|---|---|---|
| 2021/0044167 A1 | 2/2021 | Huang et al. |
| 2021/0104927 A1* | 4/2021 | Chu ....................... H02K 21/14 |
| 2021/0152042 A1* | 5/2021 | Valin .................... H02K 1/276 |
| 2022/0263361 A1* | 8/2022 | Tang ................... H02K 1/2766 |

* cited by examiner

ELECTROMAGNETIC MOTOR HAVING PERMANENT MAGNET ROTOR AND STATOR AND METHOD FOR DESIGNING THE SAME

TECHNICAL FIELD

Various embodiments of the present disclosure relate in general to an electromagnetic motor, and more particularly, to a structure and components of rotor and stator assemblies of an electromagnetic motor to improve motor performance, reduce torque ripple and lower stress to the rotor assembly.

BACKGROUND

A motor is a well-known electrical machine that converts electrical energy into mechanical energy using magnetic field linkage. Electromagnetic motors are known for their high efficiency. The electromagnetic motors are also known for their durability, controllability, and absence of electrical sparking. Due to their advantages the permanent magnet motors are widely used in automobile applications.

However, one of the well-known problems of the electromagnetic motor is torque ripple. Sources of torque ripple in the electromagnetic motors include inherent harmonics in the flux linkage, and cogging. Cogging may be a term used to describe the torque of the electromagnetic motor disconnected from the power source. Presence of harmonics in the flux linkage results in instantaneous torque that pulsates as a function of the rotor position. Torque ripple may be generally undesirable in many electromagnetic motors applications, particularly at low speed.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, an electromagnetic motor may comprise: a stator assembly; and a rotor assembly configured to be rotatable relative to the stator assembly, the rotor assembly having a plurality of poles, wherein each of one or more of the poles of the rotor assembly comprises one or more substantially I-shaped slots and one or more substantially flat-top-U-shaped slots.

At least one of the substantially flat-top-U-shaped slots may have two arm slot portions and a flat top slot portion connecting between the two arm slot portions such that the flat top portion and the two arm slot portions can be connected to form one single slot.

The two arm slot portions of the at least one of the substantially flat-top-U-shaped slots may be angled with respect to the flat top slot portion of the at least one of the substantially flat-top-U-shaped slots.

The one or more substantially I-shaped slots may be disposed closer to an outer surface of the rotor assembly than the one or more substantially flat-top-U-shaped slots.

The one or more substantially I-shaped slots and the one or more substantially flat-top-U-shaped slots, which are located closer to an outer surface of the rotor assembly, may have shorter widths and/or thicknesses.

Magnets disposed in the one or more substantially I-shaped slots and the one or more substantially flat-top-U-shaped slots, which are located closer to an outer surface of the rotor assembly, may have shorter widths and/or thicknesses.

The electromagnetic motor may further comprise a first magnet disposed in the flat top slot portion of the at least one of the substantially flat-top-U-shaped slots. Non-magnetic material or air gap may be formed in the two arm slot portions of the at least one of the substantially flat-top-U-shaped slots.

The electromagnetic motor may further comprise second and third magnets disposed in the two arm slot portions of the at least one of the substantially flat-top-U-shaped slots, respectively. Non-magnetic material or air gap may be formed in the flat top slot portion of the at least one of the substantially flat-top-U-shaped slots.

The second and third magnets disposed in the two arm slot portions of the at least one of the substantially flat-top-U-shaped slots, respectively, are identical to each other. Alternatively, the second magnet and the third magnets disposed in the two arm slot portions of the at least one of the substantially flat-top-U-shaped slots, respectively, may be different from each other.

Second and third magnets disposed in the two arm slot portions of the at least one of the substantially flat-top-U-shaped slots, respectively, may be rare-earth magnets, and a first magnet disposed in the flat top slot portion of the at least one of the substantially flat-top-U-shaped slots may be a non-rare-earth magnet.

The electromagnetic motor may further comprise: a first magnet disposed in the flat top slot portion of the at least one of the substantially flat-top-U-shaped slots; and second and third magnets disposed in the two arm slot portions of the at least one of the substantially flat-top-U-shaped slots, respectively.

One or more locators (e.g. hooks) may be formed adjacent to an end portion of the first magnet between the flat top slot portion and one of the two arm slot portions of the at least one of the substantially flat-top-U-shaped slots to hold the first magnet.

One or more locators (e.g. hooks), and air gap or non-magnetic material may be formed between the first magnet and the second or third magnet in the at least one of the substantially flat-top-U-shaped slots.

One or more magnets may be disposed within the one or more substantially I-shaped slots, and one or more locators (e.g. hooks) may be formed adjacent to an end portion of the one or more magnets disposed within the one or more substantially I-shaped slots.

Second and third magnets may be disposed in the two arm slot portions of the at least one of the substantially flat-top-U-shaped slots, respectively, and one or more locators (e.g. hooks) may be formed adjacent to one end portions of the second and third magnets which are located closer to an outer surface of the rotor assembly than other end portions of the second and third magnets.

A first magnet disposed in the flat top slot portion of the at least one of the substantially flat-top-U-shaped slots may be larger than second and third magnets disposed in the two arm slot portions of the at least one of the substantially flat-top-U-shaped slots, respectively.

The two arm slot portions of the at least one of the substantially flat-top-U-shaped slots may be symmetrical to each other. Alternatively, two arm slot portions of the at least one of the substantially flat-top-U-shaped slots may be asymmetrical to each other.

According to some exemplary embodiments, a vehicle may comprise: one or more road wheels configured to cause the vehicle to move; a steering wheel configured to generate an input for controlling the one or more road wheels; a brake assembly configured to operate a vehicle brake associated with the one or more road wheels; and one or more motors operatively connected to one or more of the one or more road wheels, the steering wheel and the brake assembly, at least one of the motors comprising: a stator assembly; and a rotor assembly configured to be rotatable relative to the stator assembly, the rotor assembly having a plurality of poles, wherein each of one or more of the poles of the rotor assembly comprises one or more substantially I-shaped slots and one or more substantially flat-top-U-shaped slots.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Permanent magnet motors with rare-earth magnets may be used for vehicle. The rare-earth permanent magnet motors exhibit high torque density and constant power operation in a wide speed range. However, due to the high cost of rare-earth magnets and to the limited supply, the permanent magnet motors with rare-earth magnets are becoming quite expensive. And, they may introduce torque ripple and togging torque. To address these issues, in some exemplary embodiments of the present disclosure, each pole of a rotor of a motor may include a combination of at least one substantially flat-top-U shaped rotor slot and at least one substantially I-shaped rotor slot. The combination of the flat-top-U shaped rotor slot(s) and the substantially I-shaped rotor slot(s) and the arrangement of magnets therein may reduce the torque ripple and cogging torque of the rotor in the overall operating range of the motor during the operation of the motor. Furthermore, although some or all of magnets disposed in the flat-top-U shaped rotor slot(s) and/or the substantially I-shaped rotor slot(s) may not have rare-earth magnet material according to certain exemplary embodiments of the present disclosure, the performance of the motor may not be deteriorated while the manufacturing cost of the motor is decreased.

Figure 1:
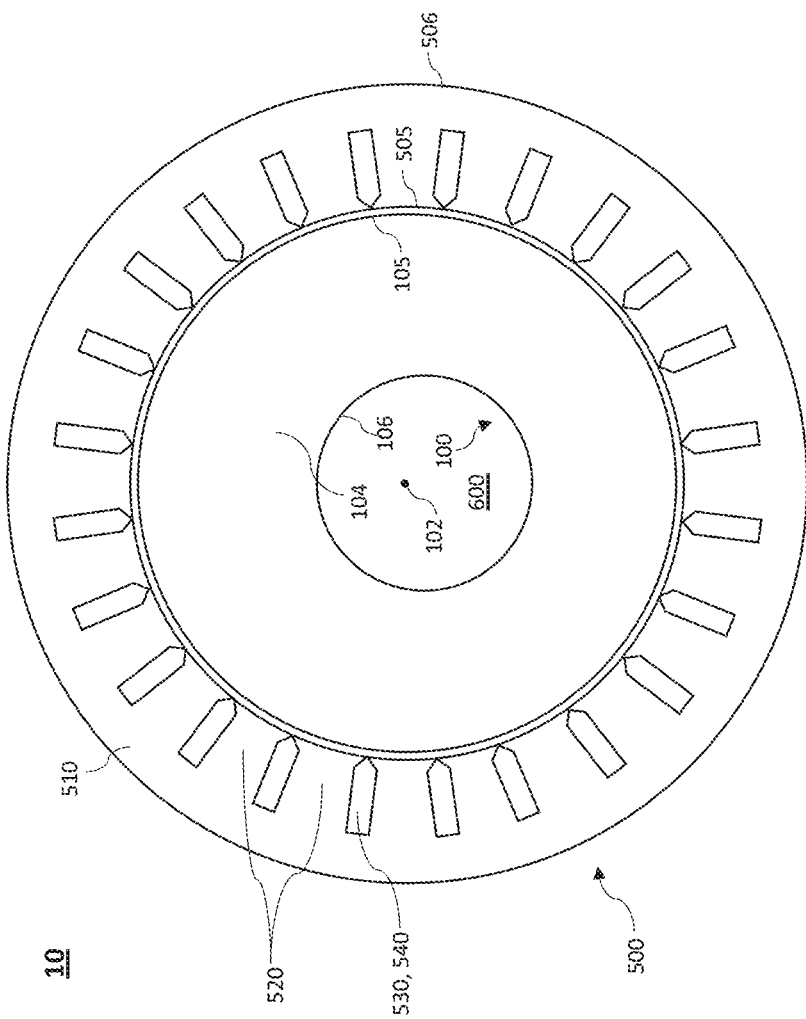
FIG. 1 is a horizontal cross-sectional view of an electromagnetic motor according to an exemplary embodiment of the present disclosure.
Figure 2:
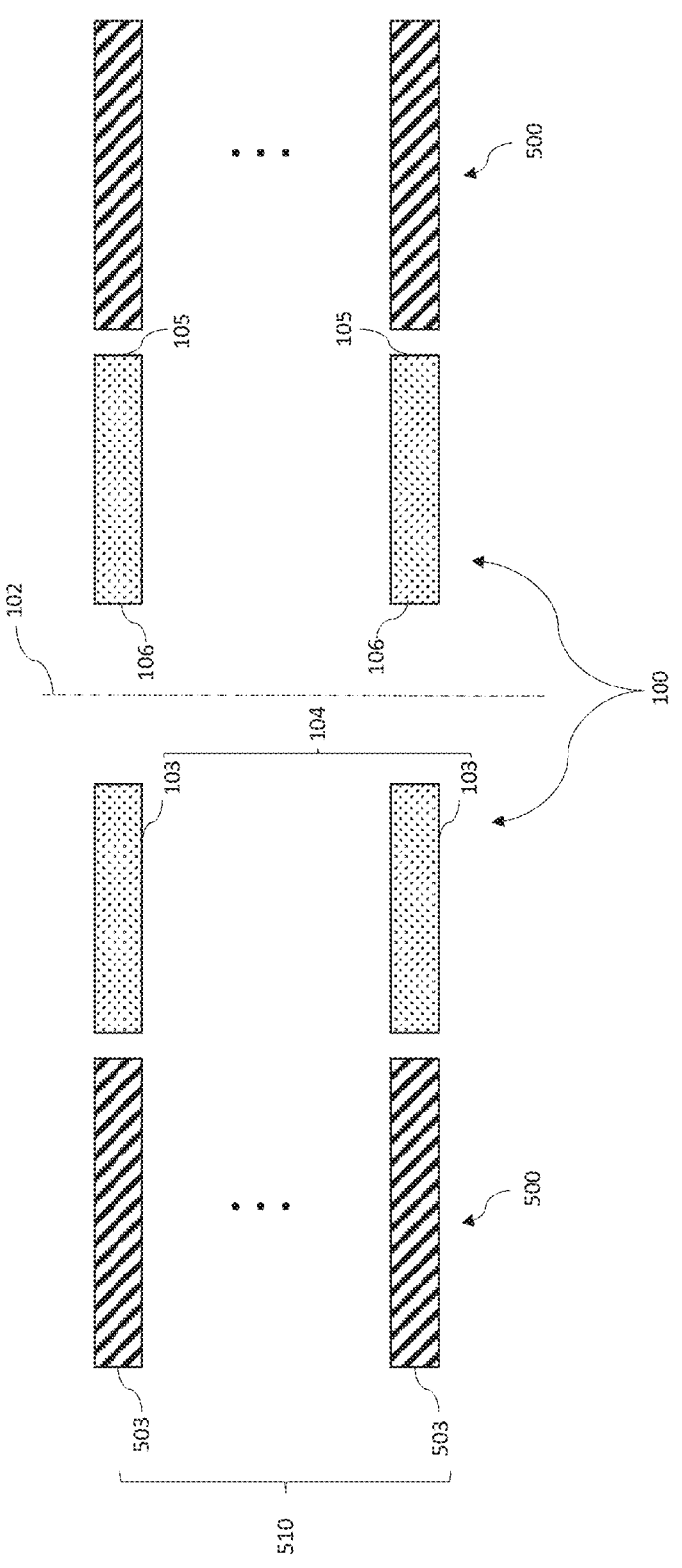
FIG. 2 is a vertical cross-sectional view of an electromagnetic motor according to an exemplary embodiment of the present disclosure.

FIG. 1 is a horizontal cross-sectional view of an electromagnetic motor according to an exemplary embodiment of the present disclosure, and FIG. 2 is a vertical cross-sectional view of an electromagnetic motor according to an exemplary embodiment of the present disclosure.

An electromagnetic motor 10 is configured to convert electrical energy into mechanical energy using magnetic field linkage. The electromagnetic motor 10 may be, for example, but not limited to, a permanent magnet assisted synchronous reluctance motor (PMa-SynRel). The electromagnetic motor 10 according to an exemplary embodiment of the present disclosure may include a rotor assembly 100, and a stator assembly 500.

The rotor assembly 100 is disposed for rotation within, and relatively to, the stator assembly 500. A rotor core 104 of the rotor assembly 100 may be rotatably seated on or fixed to a rotor shaft 600. Alternatively, the rotor assembly 100 may be disposed outside the stator assembly 500 to define an exterior rotor motor. The rotor assembly 100 and the stator assembly 500 each may be disposed about and extend along a central axis 102. The rotor assembly 100 may be disposed concentric with the stator assembly 500.

The stator assembly 500 includes a stator core 510. The stator core 510 may be generally cylindrical in shape and extend along the central axis 102. The stator core 510 may include a substantially circular outer surface 506. An inner surface 505 of the stator core 510 may be formed by a plurality of stator teeth 520. The stator teeth 520 may be arranged circumferentially and may protrude toward the rotor assembly 100. The inner surface 505 of the stator core

510 may form a cavity within the stator assembly 500 that is configured to receive the rotor assembly 100.

Stator slots 530 may be defined by adjacent pair of stator teeth 520 that form a respective slot. The stator slots 530 may be formed in the stator core 510 of the stator assembly 500. The stator slots 530 may be designed and dimensioned to receive conductors 540. The conductors 540 may be placed in the stator slots 530 to form electromagnetic windings or coils. For example, the conductors 540 may extend in the axial direction through the stator slots 530 or be disposed about (e.g., wound or slid about) the teeth 520 of the stator core 510. The stator slots 530 may have partially open slots such that small openings to the stator slots 520 are provided along the inner surface 505 of the stator core 510.

The stator core 510 (e.g. iron core) may be made of a stack of stator laminations 503 of FIG. 2, although not required, and a winding arrangement for the conductors 540 that carry an excitation current. Current flowing through the conductors 540 generates a stator electromagnetic flux. The stator flux may be controlled by adjusting the magnitude and frequency of the current flowing through the conductors 540.

Examples of the stator assembly 500 are provided in U.S. patent application Ser. No. 18/085,502, entitled "ELECTRIC MOTOR HAVING HAIRPIN TYPE WINDINGS AND METHOD FOR DESIGNING THE SAME", filed on Dec. 20, 2022, which is incorporated herein by reference in its entirety.

The rotor assembly 100 may include the rotor core 104 that is disposed on the rotor shaft 600. The rotor core 104 may radially extend (relative to the central axis 102) between an inner rotor surface 106 and an outer rotor surface 105. The inner rotor surface 106 of the rotor core 104 may be fixed to the rotor shaft 600 and may be disposed closer to the central axis 102 than the outer rotor surface 105. The outer rotor surface 105 of the rotor assembly 100 may be spaced apart from the inner stator surface 505 of the stator assembly 500 by, for example, an air gap therebetween.

As shown in FIG. 2, the rotor assembly 100 and the stator assembly 500 may be implemented as multiple rotor laminations 103 forming the rotor core 104 and multiple stator laminations 503 forming the stator core 510. The multiple rotor laminations 103 and the multiple stator laminations 503 are arranged in an axially stacked relationship. For example, the multiple rotor laminations 103 and the multiple stator laminations 503 are stacked along the central axis 102. Any number of laminations in a given design may be used, depending on design choice.

Figure 5B:
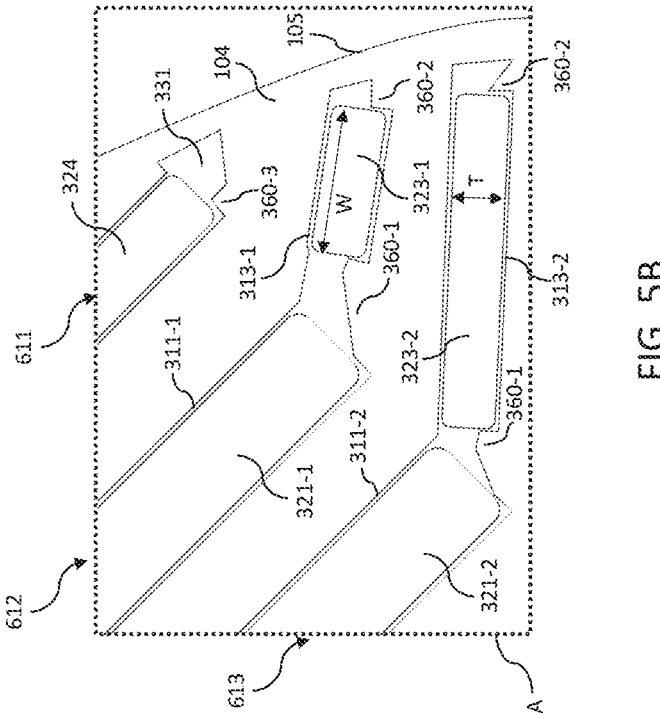
FIG. 5B is a partial enlarged view of a rotor assembly taken from a portion A in FIG. 5A.
Figure 5A:
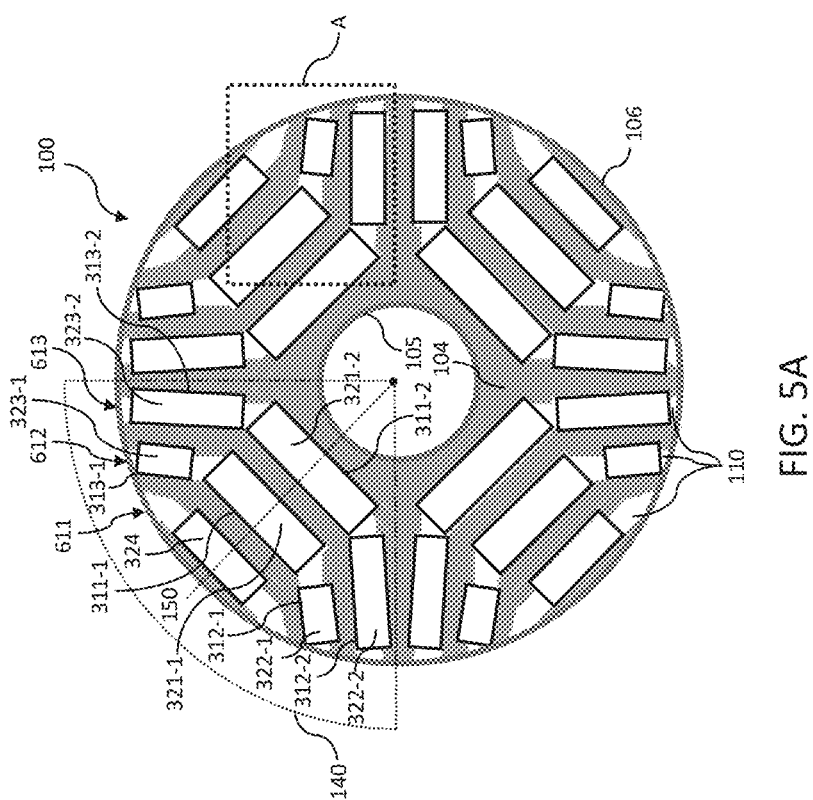
FIG. 5A is a cross-sectional view of a rotor assembly according to an exemplary embodiment of the present disclosure.
Figure 7:
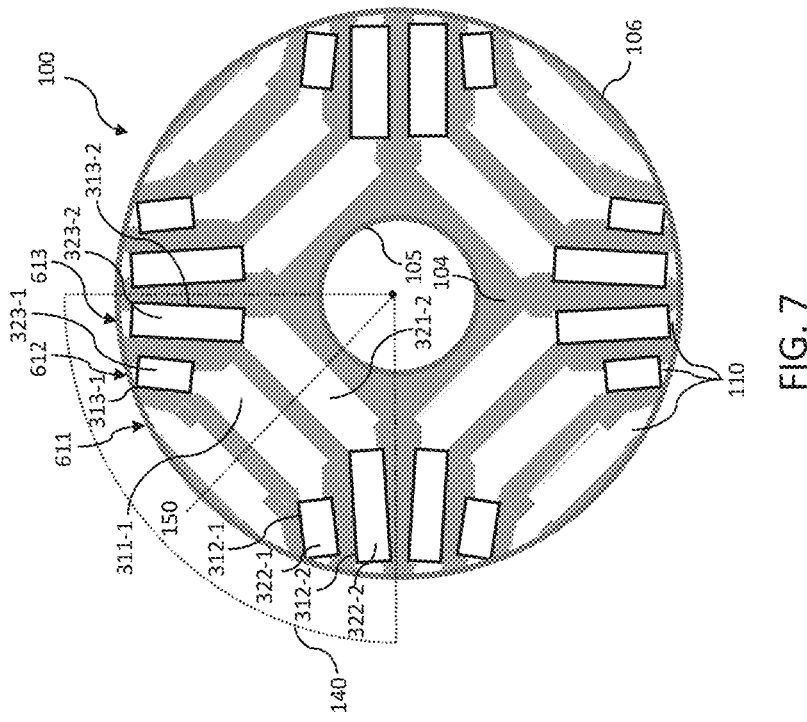
FIG. 7 is a cross-sectional view of a rotor assembly according to still another exemplary embodiment of the present disclosure.
Figure 6:
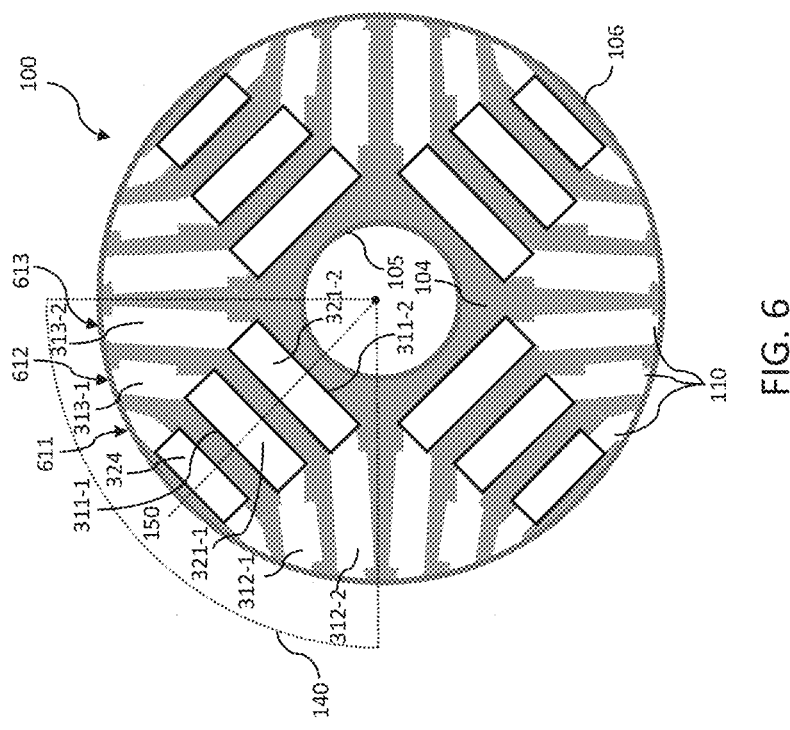
FIG. 6 is a cross-sectional view of a rotor assembly according to another exemplary embodiment of the present disclosure.

Referring to FIGS. 5 to 7, the rotor core 104 defines a plurality of slots 110 (e.g. holes or cavities or pockets) distributed within the rotor core 104. The rotor assembly 100 has a number of poles 140. Each pole 140 may include the plurality of rotor slots 110. The rotor slots 110 can be one of a magnet retention pocket or a flux barrier (e.g. a magnet free barrier). One or more permanent magnets may be disposed in each of the magnet retention pocket(s), and the flux barrier(s) may be air hole or empty or be completely or partially filled with non-magnetic material (e.g. nylon, epoxy, plastic, potting material or other filler material). The non-magnetic material could be positioned or injected into the flux barrier to increase the strength of the rotor core 104.

Each group of the rotor slots 110 including one or more permanent magnets may form a single magnet pole 140. The group of the rotor slots 110 is arranged to cooperatively form the magnetic pole 140. The rotor slots 110 may have various configurations such as, for example, but not limited to, a flat-top-U-type, an I-type, a V-type, a U-type, a spoke-type, a bar-type, or any appropriate type.

According to various exemplary embodiments of the present disclosure, each pole 140 of the rotor assembly 100 may include at least one substantially flat-top-U shaped rotor slot and at least one substantially I-shaped rotor slot. Examples of the rotor assembly 100 comprising the combination of at least one substantially flat-top-U shaped rotor slot and at least one substantially I-shaped rotor slot at each pole 140 are shown in FIGS. 5A to 7 which will be described in details below. By having the combination of at least one flat-top-U shaped rotor slot and at least one I-shaped rotor slot at each pole 140 of the rotor assembly 110, the reluctance torque can be increased, the torque ripple can be reduced, and the torque density can be improved. One or more of the flat-top-U shaped rotor slot(s) and/or one or more of the I shaped rotor slot(s) forming one single pole 140 of the rotor assembly 110 may include one or more magnets therein, while other remaining flat-top-U shaped rotor slot(s) and/or I-shaped rotor slot(s) are formed to be air hole or empty or are partially or completely filled with non-magnetic material. The non-magnetic material could be positioned or injected into the flux barrier to inhibit unwanted movement of the magnet.

Figure 3A:
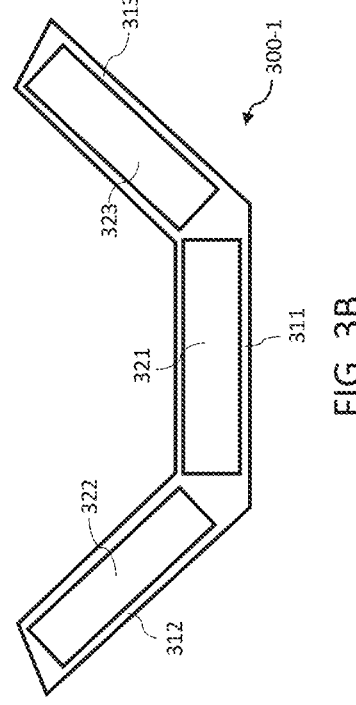
FIGS. 3A to 3D illustrate examples of substantially flat-top-U-shaped slots according to exemplary embodiments of the present disclosure.

An example of a substantially flat-top-U shaped rotor slot is illustrated in FIG. 3A. The substantially flat-top-U shape may mean an overall shape that is similar to the capital letter U but having a flat shape at an endturn between two arms. For example, according to an exemplary embodiment of FIG. 3A, a flat-top-U shaped rotor slot 300 may have two arm slot portions 312, 313 and a flat top slot portion 311. The flat top slot portion 311 is formed between the first and second arm slot portions 312 and 313. The first and second arm slot portions 312 and 313 are extended from ends of the flat top slot portion 311, respectively. The first and second arm slot portions 312 and 313 and the flat top slot portion 311 are connected to form one single slot. In other words, the flat top slot portion 311 connects between two arm slot portions 312 and 313 such that the flat top portion 311 and two arm slot portions 312 and 313 can be connected to form one single slot as illustrated in FIG. 3A.

The two arm slot portions 312 and 313 are angled or slanted with respect to the flat top slot portion 311. The angle θ between the flat top slot portion 311 and the arm slot portion 312 or 313 may be between 0° and 180°, preferably between 100° and 150°, for example, but not limited to, 100°, 110°, 125°, and 150° For reduction in torque ripple and increase in torque output of the motor 10.

The first arm slot portion 312 and the second arm slot portion 313 may be positioned, shaped, and sized symmetrically to each other with respect to the d-axis of the pole to ease the manufacturing process of the rotor core 104, reduce the manufacturing cost of the rotor assembly 100, and minimize the manufacturing complexity of the rotor assembly 100. Alternatively, the first arm slot portion 312 and the second arm slot portion 313 may be asymmetric to each other in order to further reduce the torque ripple or cogging toque of the motor 10.

One or more magnets may be included in one or more of the flat top slot portion 311, the first arm slot portion 312, and the second arm slot portion 313. Each of the slot portions 311, 312, 313 in which a magnet is positioned is configured to facilitate insertion of a permanent magnet into each of the slot portions while also providing acceptable retention and reliable positioning of the permanent magnet within each of the slot portions.

Figure 3B:
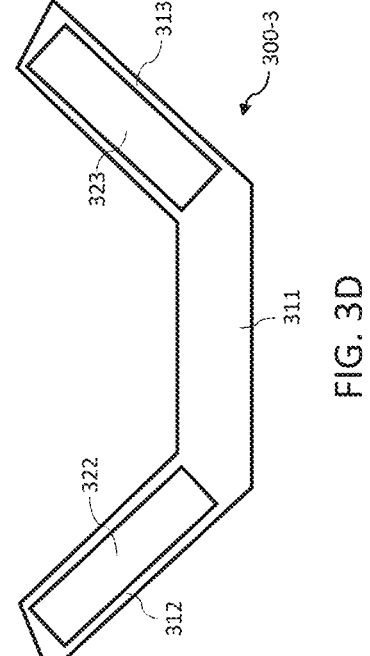

In a first exemplary embodiment of a substantially flat-top-U shaped slot 300-1 shown in FIG. 3B, three magnets can be arranged in one flat-top-U shaped slot 300-1. A first magnet 321 may be positioned in the flat top slot portion 311, a second magnet 322 may be positioned in the first arm slot portion 312, and a third magnet 323 may be positioned in the second arm slot portion 313. The magnets 321 to 323 may be a rectangular bar type to optimize the usage of the magnet and reduce the manufacturing cost, although the magnets 321 to 323 can have any shape for a necessary operation of the motor 10.

As a first example of the first exemplary embodiment of the flat-top-U shaped slot 300-1, the first, second, and third magnets 321, 322, and 323 are the same as each other. For instance, the size, shape, material and/or dimensions of the first, second, and third magnets 321, 322, and 323 can be identical to each other.

As a second example of the first exemplary embodiment of the flat-top-U shaped slot 300-1, the first magnet 321 disposed in the flat top slot portion 311 can be different from the second and third magnets 322 and 323 positioned in the two arm slot portions 312 and 313. The size (e.g. width, length, and/or thickness), shape and/or material of the first magnet 321 may be different from those of the second and third magnets 322 and 323. For instance, the second and third magnets 322 and 323 located in the two arm slot portions 312 and 313 can be smaller than the first magnet 321 positioned in the flat top slot portion 311. Alternatively, the second and third magnets 322 and 323 located in the two arm slot portions 312 and 313 can be larger than the first magnet 321 positioned in the flat top slot portion 311. Additionally, the first magnet 321 positioned in the flat top slot portion 311 may consist of different material from the second and third magnets 322 and 323 disposed in the first and second arm slot portions 312 and 313. For instance, the first magnet 321 in the flat top slot portion 311 is a permanent magnet which does not include any rare earth material, while the second and third magnets 323 and 323 included in the two arm slot portions 312 and 313 are rare earth magnets (for example, samarium cobalt (Sm—Co) magnet or neodymium iron boron (Nd—Fe—B) magnet), or vice versa, to maximize the motor torque density. By using the combination of rare earth magnets and non-rare-earth permanent magnets not including any rare earth material instead of including rare earth magnets only in the motor 10 without deteriorating the performance of the motor 10, the manufacturing cost of the motor 10 may be decreased and the risk of the unstable supply of rare earth material may be reduced.

And, the second and third magnets 323 and 323 included in the two arm slot portions 312 and 313 may be any high temperature magnet having higher coercivity, higher grade or higher operable temperature, for example, but not limited to, samarium cobalt (Sm—Co) magnet or neodymium iron boron (Nd—Fe—B) magnet, or high energy density permanent magnet, or any type of magnet which is appropriate for operation of the motor 10. However, the first magnet 321 positioned in the flat top slot portion 311 may be a lower temperature magnet having lower coercivity, lower grade or lower operable temperature. For example, the lower temperature magnet may have magnetic material with H, SH, or UH grade, or conventional permanent magnets such as alnico, ferrite or ceramic magnets, and sintered or bonded ferrite material magnet.

As a third example of the first exemplary embodiment of the flat-top-U shaped slot 300-1, all of the first, second, and third magnets 321, 322, and 323 may be different from each other. Each of the first, second, and third magnets 321, 322, and 323 may have different a size (e.g. width, length, and/or thickness), material, and/or shape.

Figure 3C:
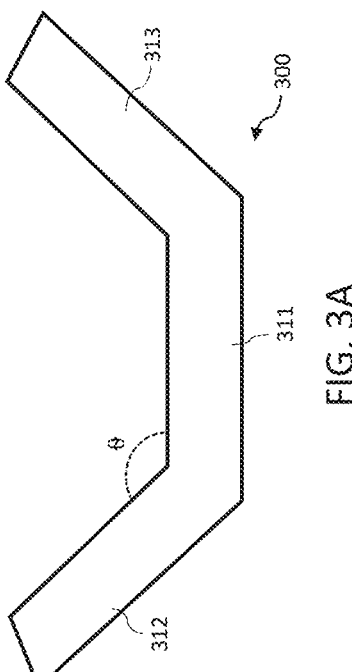

In a second exemplary embodiment of a flat-top-U shaped slot 310-2 illustrated in FIG. 3C, one or more magnets can be included in the flat top slot portion 311 only, while the two arm slot portions 312 and 313 are empty or are filled with non-magnetic material.

Figure 3D:
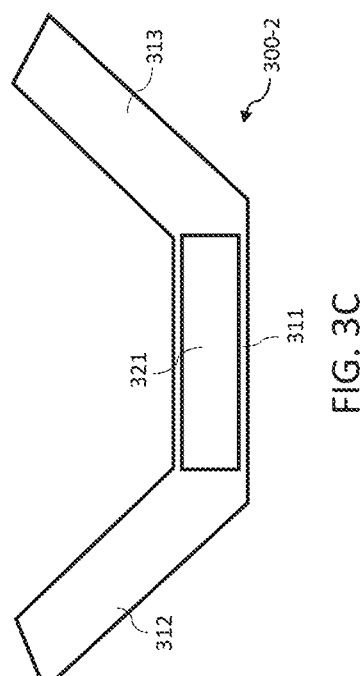

In a third exemplary embodiment of a flat-top-U shaped slot 310-3 illustrated in FIG. 3D, in order to achieve better performance of the motor 10 such as reduction in torque ripple and increase in the output torque or speed of the motor 10, two magnets 322 and 323 are disposed in the two arm slot portions 312 and 313, respectively, but the flat top slot portion 311 has no magnet therein and may be formed to be air hole or empty or is completely or partially filled with non-magnetic material.

However, as illustrated in FIG. 3A, the whole of the flat-top-U shaped slot 300(s) may be formed to be air hole or empty, or be completely or partially filled with non-magnetic material. This slot can function as a flux barrier. The flux barrier may impede magnetic flux because vacuum or non-magnetic material has relatively low magnetic permeability compared to the material of the rotor core 104.

Figure 4B:
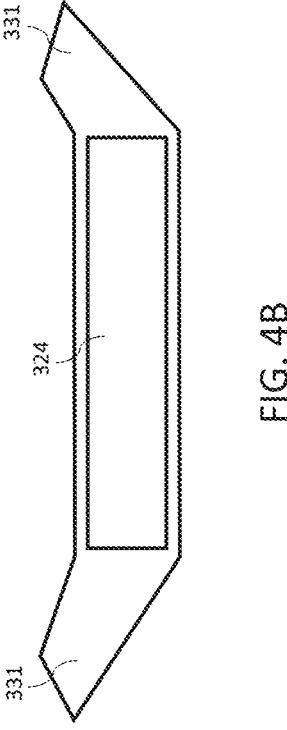
FIGS. 4A and 4B show examples of substantially I-shaped slots according to exemplary embodiments of the present disclosure.
Figure 4A:
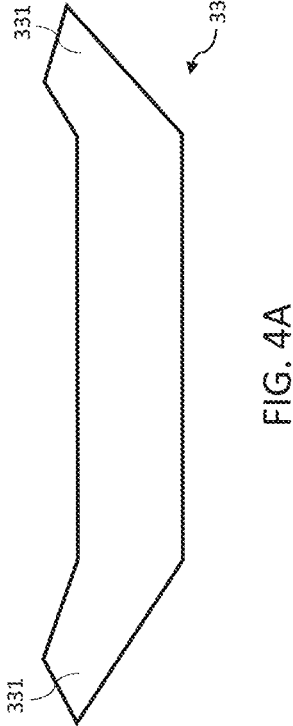

An example of a substantially I-shaped rotor slot 330 is illustrated in FIG. 4A. The substantially I-shape may mean an overall shape that is substantially similar to the capital letter I. The substantially I-shaped rotor slot 330 may have an elongated portion that extends across a pole and end portions 331 that are angled with regard to the elongated portion. For example, the substantially I-shaped rotor slot may be substantially rectangular in cross-sectional shape. However, one or both ends or edges, or one or more corners of the I-shaped rotor slot may have irregular shapes (e.g. a shape having sides and angles of different lengths and sizes), although not required. For instance, the cross-section of the I-shaped rotor slot has a generally rectangular shape with irregular shapes at or around one or more ends, edges or corners of the rectangular shape. The irregular shaped portion of the I-shaped rotor slot may have a plurality of angled flat or curved surfaces, or combination thereof. The I-shaped rotor slot 330 may be formed to be air hole or empty or is completely or partially filled with non-magnetic material.

A fourth magnet 324 may be disposed in the I-shaped rotor slot 330 as illustrated in FIG. 4B. The I-shaped rotor slot 330 may be slightly oversized around opposite ends, edges or corners of the fourth magnet 324 to limit magnetic flus leakage between north and south poles of the fourth magnet 324. For example, the fourth magnet 324 included in the substantially I-shaped rotor slot 330 may have a rectangular bar type magnet, and irregularly shaped portions 331 of the substantially I-shaped rotor slot 330 which can form air gap or be filled with non-magnetic material to reduce the torque ripple or cogging toque of the motor 10. The shapes of the irregularly shaped portions 331 of the substantially I-shaped rotor slot 330 can define magnetic flux passages and thereby operate to guide the magnetic flux in a desired direction. For example, the irregularly shaped portions 331 of the substantially I-shaped rotor slot 330 may be irregularly shaped square, polygon, half-oval, or half-circle. The irregularly shaped portions 331 of the substantially I-shaped rotor slot 330 may be slanted toward the outer surface 105 of the rotor core 104. The irregularly shaped portions 331 of the substantially I-shaped rotor slot 330 can lower the stress to the rotor core 104.

One or more locators 360, for example, but not limited to, hooks, protrusions or the like, may be formed on an inner surface of the rotor slots 110 to secure the magnets 321, 322, 323, 324 disposed in the rotor slots 110. The locators 360 such as hooks or protrusions can inhibit unwanted movement of the magnets 321, 322, 323, 324, such as a side-to-side or axial movement of the magnets 321, 322, 323, 324, within the rotor slots 110. And, during the process of filling non-magnetic materials to rotor slots 110, the locators 360 can hold the magnets 321, 322, 323, 324 in position. The locators 360 may protrude inward from the inner surface of the rotor slots 110. The locators 360 may be shaped as a hook, a protrusion, an arrow, a triangle, a square, a polygon, a half-circle, a half-oval, a curve, combination thereof, or any suitable shape which can securely support the magnets 321, 322, 323, 324. These shapes of the locators 360 can improve demagnetization ratio, the reduction of torque ripple, and the increase of the torque density. The magnets 321, 322, 323, 324 can be firmly held in the desired position by the locators 360. The locators 360 may be positioned adjacent to one end side or edge or one corner of the magnet 321, 322, 323, 324.

Referring to FIGS. 5A and 5B, in the flat-top-U shaped slots 612 and 613, one or more first locators 360-1, for example, but not limited to, hooks, protrusions, and the like, may be provided between the first magnet 321-1, 321-2 disposed in the flat top slot portion 311-1, 311-2 and the second or third magnet 322-1, 322-1 or 323-1, 323-2 positioned in the arm slot portion 312-1, 312-2 or 313-1, 313-2 so that one locator 360-1 can support both the first magnet 321-1, 321-2 disposed in the flat top slot portion 311-1, 311-2 and the second or third magnet 322-1, 322-1 or 323-1, 323-2 positioned in the arm slot portion 312-1, 312-2 or 313-1, 313-2. At least a part of the first locator 360-1 may contact both the first magnet 321-1, 321-2 and the second or third magnet 322-1, 322-1 or 323-1, 323-2 in order to securely position each of the first magnet 321 and the second or third magnet 322-1, 322-1 or 323-1, 323-2 within the flat-top-U shaped slot 612, 613 with an appropriate spacing between the first magnet 321-1, 321-2 and the second or third magnet 322-1, 322-1 or 323-1, 323-2. Accordingly, both the first locator 360-1 and air gap (or non-magnetic material) can be provided between the first magnet 321-1, 321-2 and the second or third magnet 322-1, 322-1 or 323-1, 323-2.

Additionally, one or more second locators 360-2, for example, but not limited to, hooks, protrusions, and the like, may be formed adjacent to one end, corner or edge of the second or third magnet 322-1, 322-1 or 323-1, 323-2 which is closer to the outer surface 105 of the rotor core 104 than the other end, corner or edge of the second or third magnet 322-1, 322-1 or 323-1, 323-2 which is closer to the rotor shaft 600. Therefore, the second or third magnet 322-1, 322-1 or 323-1, 323-2 can be securely fixed between the first locator 360-1 and the second locator 360-2.

In the I-shaped slot 611, at least two third locators 360-3, for example, but not limited to, hooks, protrusions, and the like, can be formed adjacent to opposite ends, corners or edges of one magnet 324, respectively, in order to hold in place.

As illustrated in some exemplary embodiments of the present disclosure shown in FIGS. 5A to 7, each pole 140 of the rotor assembly 100 may include the combination of at least one substantially flat-top-U shaped rotor slot and at least one substantially I-shaped rotor slot. For example, each pole 140 of the rotor assembly 100 may have one or more of the substantially flat-top-U shaped rotor slots 300, 300-1,

300-2, 300-3 illustrated in FIGS. 3A to 3D as well as one or more of the substantially I-shaped rotor slots 330 shown in FIGS. 4A and 4B.

As described above, the rotor assembly 100 can include any number of poles, for example, but not limited to, two, four, six and so on. Each pole 40 of the rotor assembly 100 may have a plurality of rotor slots which are structured in a multi-layer structure. The multi-layered rotor slots at each pole may be arranged to be parallel to each other, although it is not required. At each pole 140, at least one substantially flat-top-U-shaped rotor slot and at least one substantially I-shaped rotor slot can be distributed along a radial direction of the rotor core 104. In certain exemplary embodiments illustrated in FIGS. 5A to 7, each pole 140 can be formed by one I-shaped rotor slot 611 and two flat-top-U-shaped rotor slots 612 and 613. The I-shaped rotor slot(s) may be arranged to be closer to the outer surface 105 of the rotor core 104 than the flat-top-U shaped rotor slot(s). Alternatively, the I-shaped rotor slot may be positioned between two flat-top-U shaped rotor slots or be located to be closer to the rotor shaft 600 than the flat-top-U shaped rotor slot.

The flat top slot portion 311 of the flat-top-U shaped rotor slot and the I-shaped rotor slot extend in a direction perpendicular to an interpolar axis 151 (e.g. a quadrature-axis). Further, the I-shaped rotor slot and the flat top slot portion 311 of the flat-top-U shaped rotor slot may be arranged to be parallel to each other. Alternatively, to lower the torque ripple of the motor 10, the I-shaped rotor slot and the flat top slot portion 311 of the flat-top-U shaped rotor slot may be formed not to be parallel to each other.

As shown in FIGS. 5A to 7, a size or at least one dimension (e.g. an width W and/or thickness T) of one rotor slot or magnet located closer to the outer surface 105 of the rotor core 104 may be smaller than a size or at least one dimension of another rotor slot or magnet which is located to be farther from the outer surface 105 of the rotor core 104. Sizes or dimensions (e.g. widths W and/or thicknesses T) of multi-layered rotor slots or magnets therein may gradually decrease from the outer surface 105 of the rotor core 104 to the rotor shaft 600. For instance, referring to FIGS. 5A and 5B, a size or at least one dimension (e.g. an width W and/or thickness T) of the fourth magnet 324 in the substantially I-shaped rotor slot 611 which is disposed closest to the outer surface 105 of the rotor core 104 is the smallest and a size or at least one dimension (e.g. an width W and/or thickness T) of the a first magnet 321-2 in the flat top slot portion of the substantially flat-top-U shaped rotor slot 311-2 which is disposed farthest from the outer surface 105 of the rotor core 104 is the largest among the fourth magnet 324, the first magnet 321-1, and the first magnet 321-2 arranged on the interpolar axis 151. And, one second magnet 322-1 in a left arm portion (and/or the third magnet 323-1 in a right arm portion) of the substantially flat-top-U shaped rotor slot 612 positioned closer to the outer surface 105 of the rotor core 104 may be sized or dimensioned to be smaller than another second magnet 322-2 positioned in a left arm portion (and/or another third magnet 323-2 in a right arm portion) of the substantially flat-top-U shaped rotor slot 613 located farther from the outer surface 105 of the rotor core 104.

In an exemplary embodiment shown in FIG. 5A, each of the I-shaped slot 610 and the flat top slot portions 311-1, 311-2 and arm slot portions 312-1, 312-2, 313-1, 313-2 of the flat-top-U-shaped rotor slots 612 and 613 has at least one magnet therein.

However, one or more of the I-shaped slot 610 and the flat top slot portions 311-1, 311-2 and arm slot portions 312-1, 312-2, 313-1, 313-2 of the flat-top-U-shaped rotor slots 612 and 613 may be formed to be air hole or empty or be completely or partially filled with non-magnetic material (e.g. nylon, epoxy, plastic, potting material or other filler material). For example, as illustrated in FIG. 6, the I-shaped slot 610 and the flat top slot portions 311-1, 311-2 of the flat-top-U-shaped rotor slots 612 and 613 each has at least one magnet therein, while the arm slot portions 312-1, 312-2, 313-1, 313-2 of the flat-top-U-shaped rotor slots 612 and 613 may be formed to be air hole or empty or be filled with non-magnetic material. Alternatively, the I-shaped slot 610 and the flat top slot portions 311-1, 311-2 of the flat-top-U-shaped rotor slots 612 and 613 may be formed to be air hole or empty or be filled with non-magnetic material, while the arm slot portions 312-1, 312-2, 313-1, 313-2 of the flat-top-U-shaped rotor slots 612 and 613 each has at least one magnet therein.

According to some embodiments of the present disclosure, the combination of at least one substantially flat-top-U shaped rotor slot and at least one substantially I-shaped rotor slot in the rotor assembly 100 and magnets therein may improve the ripple operation of the motor 10 and may result in a decrease in torque ripple. In addition, the shapes, materials, arrangements of at least one substantially flat-top-U shaped rotor slot and at least one substantially I-shaped rotor slot in the rotor assembly 100 and magnets therein can reduce the cogging torque without decreasing the torque and power output of the motor 10.

Figure 8:
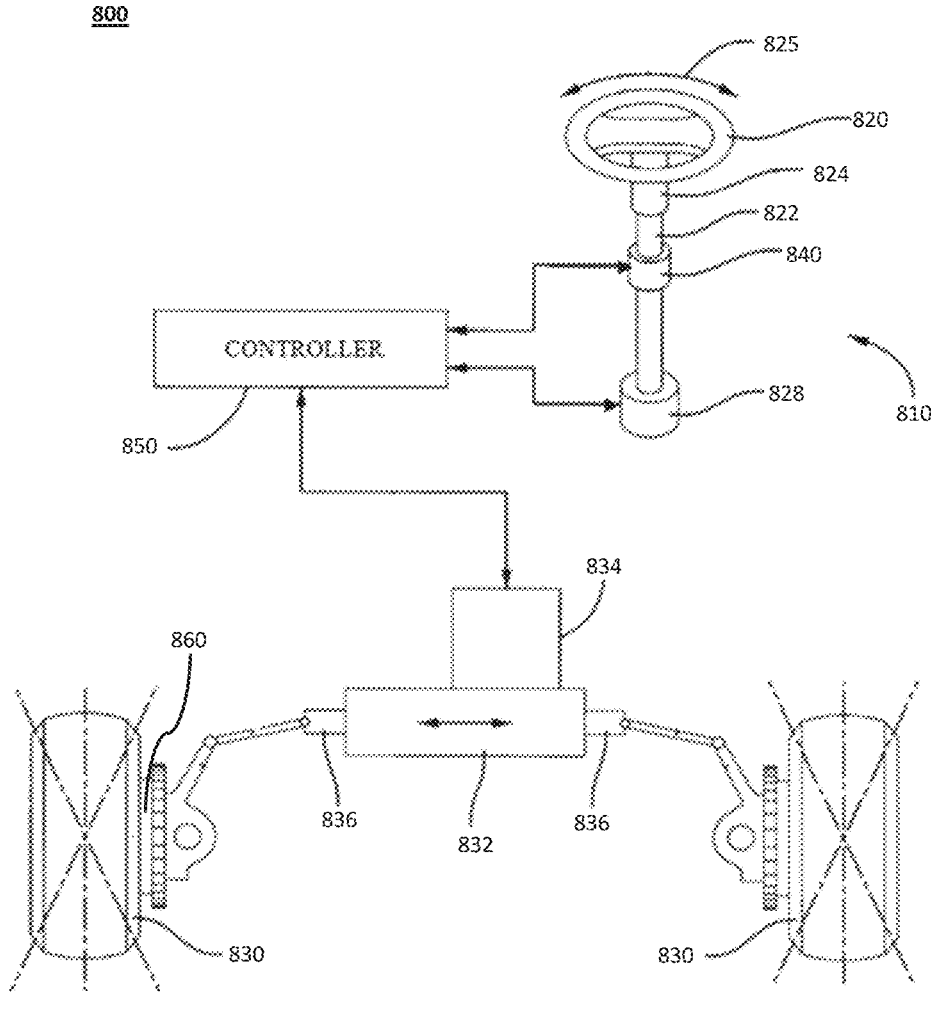
FIG. 8 is a schematic view of a vehicle including a steering system and a brake assembly according to an exemplary embodiment of the present disclosure.

The motor 10 according to some exemplary embodiments of the present disclosure may be employed in a vehicle 800. The vehicle 800 may be any passenger or commercial automobile such as a hybrid vehicle, an electric vehicle, or any other type vehicles. FIG. 8 is a schematic view of a vehicle including a steering system and a brake assembly according to an exemplary embodiment of the present disclosure. The vehicle 800 may include a steering system 810 for use in a vehicle. The steering system 810 can allow a driver or operator of the vehicle 800 to control the direction of the vehicle 800 or road wheels 830 of the vehicle 800 through the manipulation of a steering wheel 820. The steering wheel 820 is operatively coupled to a steering shaft (or steering column) 822. The steering wheel 820 may be directly or indirectly connected with the steering shaft 822. For example, the steering wheel 820 may be connected to the steering shaft 822 through a gear, a shaft, a belt and/or any connection means. The steering shaft 822 may be installed in a housing 824 such that the steering shaft 822 is rotatable within the housing 824.

The road wheels 830 may be connected to knuckles, which are in turn connected to tie rods. The tie rods are connected to a steering assembly 832. The steering assembly 832 may include a steering actuator motor 834 (e.g. the motor 10 described above) and steering rods 836. The steering rods 836 may be operatively coupled to the steering actuator motor 834 such that the steering actuator motor 834 is adapted to move the steering rods 836. The movement of the steering rods 836 controls the direction of the road wheels 830 through the knuckles and tie rods.

One or more sensors 840 may be configured to detect position, angular displacement or travel 825 of the steering shaft 822 or steering wheel 820, as well as detecting the torque of the angular displacement. The sensors 840 provide electric signals to a controller 850 indicative of the angular displacement and torque 825. The controller 850 sends and/or receives signals to/from the steering actuator motor 834 to actuate the steering actuator motor 834 in response to the angular displacement 825 of the steering wheel 820.

In the steer-by-wire steering system, the steering wheel 820 may be mechanically isolated from the road wheels 830. For example, the steer-by-wire system has no mechanical link connecting the steering wheel 825 from the road wheels 830. Accordingly, the steer-by wire steering system may comprise a feedback actuator or steering feel actuator 828 comprising an electric motor (e.g. the motor 10 described above) which is connected to the steering shaft or steering column 822. The feedback actuator or steering feel actuator 828 provides the driver or operator with the same "road feel" that the driver receives with a direct mechanical link.

Although the embodiment illustrated in FIG. 8 shows the vehicle having the steer-by-wire steering system, the motor 10 according to exemplary embodiments of the present disclosure can be used in a vehicle having a mechanical steering system. The mechanical steering system typically includes a mechanical linkage or a mechanical connection between the steering wheel 820 and the road wheels 830. In the mechanical steering system, the steering actuator motor 834 includes an electric motor (e.g. the motor 10 described above) to provide power to assist the movement of the road wheels 830 in response to the operation of the driver or a control signal of the controller 850.

Accordingly, the motor 10 according to certain embodiments of the present disclosure can be used as the steering actuator motor 834 or can be included in the feedback actuator or steering feel actuator 828.

The motor 10 can be employed in an electromagnetic brake assembly 860. The electromagnetic brake assembly 860 is configured to cause the road wheel 830 to slow or stop motion using electromagnetic force to apply mechanical resistance or friction by using the torque generated by the motor 10.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. An electromagnetic motor comprising:

a stator assembly; and a rotor assembly configured to be rotatable relative to the stator assembly, the rotor assembly having a plurality of poles, wherein each of one or more of the poles of the rotor assembly comprises one or more substantially I-shaped slots and one or more substantially flat-top-U-shaped slots, wherein any magnet disposed in the one or more substantially I-shaped slots and the one or more substantially flat-top-U-shaped slots, which is located closer to an outer surface of the rotor assembly, have shorter widths and/or thicknesses than another magnet disposed in the one or more substantially I-shaped slots and the one or more substantially flat-top-U-shaped slots located farther from the outer surface of the rotor assembly, at least one of the substantially flat-top-U-shaped slots has two arm slot portions and a flat top slot portion connecting between the two arm slot portions such that the flat top portion and the two arm slot portions are connected to form one single slot, the electromagnetic motor further comprises second and third magnets disposed in the two arm slot portions of the at least one of the substantially flat-top-U-shaped slots, respectively, and the second magnet and the third magnets disposed in the two arm slot portions of the at least one of the substantially flat-top-U-shaped slots, respectively, are different from each other.

2. The electromagnetic motor according to claim 1, wherein the two arm slot portions of the at least one of the substantially flat-top-U-shaped slots are angled with respect to the flat top slot portion of the at least one of the substantially flat-top-U-shaped slots.

3. The electromagnetic motor according to claim 1, wherein the one or more substantially I-shaped slots are disposed closer to an outer surface of the rotor assembly than the one or more substantially flat-top-U-shaped slots.

4. The electromagnetic motor according to claim 1, wherein any slot of the one or more substantially I-shaped slots and the one or more substantially flat-top-U-shaped slots, which is located closer to an outer surface of the rotor assembly, has shorter widths and/or thicknesses than another slot located farther from the outer surface of the rotor assembly.

5. The electromagnetic motor according to claim 1, further comprising a first magnet disposed in the flat top slot portion of the at least one of the substantially flat-top-U-shaped slots.

6. The electromagnetic motor according to claim 5, wherein non-magnetic material or air gap is formed in the two arm slot portions of the at least one of the substantially flat-top-U-shaped slots.

7. The electromagnetic motor according to claim 5, wherein one or more hooks are formed adjacent to an end portion of the first magnet between the flat top slot portion and one of the two arm slot portions of the at least one of the substantially flat-top-U-shaped slots to hold the first magnet.

8. The electromagnetic motor according to claim 1, wherein second and third magnets disposed in the two arm slot portions of the at least one of the substantially flat-top-U-shaped slots, respectively, are rare-earth magnets, and a first magnet disposed in the flat top slot portion of the at least one of the substantially flat-top-U-shaped slots is a non-rare-earth magnet.

9. The electromagnetic motor according to claim 1, wherein non-magnetic material or air gap is formed in the flat top slot portion of the at least one of the substantially flat-top-U-shaped slots.

10. The electromagnetic motor according to claim 1, further comprising:

a first magnet disposed in the flat top slot portion of the at least one of the substantially flat-top-U-shaped slots; and second and third magnets disposed in the two arm slot portions of the at least one of the substantially flat-top-U-shaped slots, respectively.

11. The electromagnetic motor according to claim 10, wherein one or more hooks, and air gap or non-magnetic material are formed between the first magnet and the second or third magnet in the at least one of the substantially flat-top-U-shaped slots.

12. The electromagnetic motor according to claim 1, wherein:

one or more magnets are disposed within the one or more substantially I-shaped slots, and one or more hooks are formed adjacent to an end portion of the one or more magnets disposed within the one or more substantially I-shaped slots.

13. The electromagnetic motor according to claim 1, wherein:

second and third magnets are disposed in the two arm slot portions of the at least one of the substantially flat-top-U-shaped slots, respectively, and one or more hooks are formed adjacent to one end portions of the second and third magnets which are located closer to an outer surface of the rotor assembly than other end portions of the second and third magnets.

14. The permanent magnet motor according to claim 1, wherein a first magnet disposed in the flat top slot portion of the at least one of the substantially flat-top-U-shaped slots is larger than second and third magnets disposed in the two arm slot portions of the at least one of the substantially flat-top-U-shaped slots, respectively.

15. A vehicle comprising:

one or more road wheels configured to cause the vehicle to move;

a steering wheel configured to generate an input for controlling the one or more road wheels;

a brake assembly configured to operate a vehicle brake associated with the one or more road wheels; and one or more motors operatively connected to one or more of the one or more road wheels, the steering wheel and the brake assembly, at least one of the motors comprising:

a stator assembly; and a rotor assembly configured to be rotatable relative to the stator assembly, the rotor assembly having a plurality of poles, wherein each of one or more of the poles of the rotor assembly comprises one or more substantially I-shaped slots and one or more substantially flat-top-U-shaped slots, wherein any magnet disposed in the one or more substantially I-shaped slots and the one or more substantially flat-top-U-shaped slots, which is located closer to an outer surface of the rotor assembly, have shorter widths and/or thicknesses than another magnet disposed in the one or more substantially I-shaped slots and the one or more substantially flat-top-U-shaped slots located farther from the outer surface of the rotor assembly, at least one of the substantially flat-top-U-shaped slots has two arm slot portions and a flat top slot portion connecting between the two arm slot portions such that the flat top portion and the two arm slot portions are connected to form one single slot, the electromagnetic motor further comprises second and third magnets disposed in the two arm slot portions of the at least one of the substantially flat-top-U-shaped slots, respectively, and the second magnet and the third magnets disposed in the two arm slot portions of the at least one of the substantially flat-top-U-shaped slots, respectively, are different from each other.

* * * * *